(12) United States Patent
Schleicher

(10) Patent No.: US 10,300,537 B2
(45) Date of Patent: May 28, 2019

(54) CUTTING INSERT FOR A MILLING CUTTER AND MILLING CUTTER

(71) Applicant: Kennametal Inc., Latrobe, PA (US)

(72) Inventor: Sebastian Schleicher, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 113 days.

(21) Appl. No.: 15/451,250

(22) Filed: Mar. 6, 2017

(65) Prior Publication Data

US 2017/0252836 A1   Sep. 7, 2017

(30) Foreign Application Priority Data

Mar. 4, 2016 (DE) .................... 10 2016 104 002

(51) Int. Cl.
*B23C 5/20* (2006.01)
*B23C 5/22* (2006.01)

(52) U.S. Cl.
CPC .............. *B23C 5/20* (2013.01); *B23C 5/207* (2013.01); *B23C 5/22* (2013.01); *B23C 2200/0455* (2013.01); *B23C 2200/125* (2013.01); *B23C 2200/128* (2013.01)

(58) Field of Classification Search
CPC ...... B23C 2200/0455; B23C 2200/128; B23C 5/22; B23C 5/207; B23C 5/20; B23C 2200/125; B23C 2200/126
See application file for complete search history.

(56) References Cited

U.S. PATENT DOCUMENTS

2010/0124465 A1*  5/2010  Morrison .............. B23C 5/1045
                                                       407/42

FOREIGN PATENT DOCUMENTS

DE     102010063611 A1 *  6/2012  ........... B23B 27/145
DE     102016104002 A1     9/2017
WO     WO 2011126231 A2 * 10/2011  ............... B23C 5/06

* cited by examiner

*Primary Examiner* — Alan Snyder
(74) *Attorney, Agent, or Firm* — Matthew S. Bedsole

(57) ABSTRACT

A cutting insert (20) for a milling cutter (10) is described, wherein the cutting insert (20) comprises a first main surface (22) for abutment against a stop surface (24) oriented substantially perpendicular to the direction of rotation of the milling cutter (10), a second main surface (26) which is opposite to the first main surface (22), which comprises the cutting surface, and a lateral surface (28) which connects the first main surface (22) with the second main surface (26) and which comprises the free surface. The lateral surface (28) has at least one clamping section (38) by which the cutting insert (20) is clamped in a recess (18) in a tool body (12) by means of a clamping element (40), in particular wherein the cutting insert (20) is a turning cutting insert. Furthermore, a milling cutter (10) is described.

15 Claims, 3 Drawing Sheets

CUTTING INSERT FOR A MILLING CUTTER AND MILLING CUTTER

RELATED APPLICATIONS

This application claims priority to German Patent Application No 1020161040029 filed Mar. 4, 2016. The contents of the foregoing application are incorporated herein by reference in their entirety.

FIELD OF THE INVENTION

The present invention relates to a cutting insert for a milling cutter and a milling cutter.

BACKGROUND

Cutting inserts for milling cutters are known from the prior art which are clamped in a tool body of the milling cutter by means of a clamping element, for example by means of a screw. The clamping element is thereby assigned to a main surface of the cutting insert, that is to say a relatively large surface of the cutting insert in order to fix the cutting insert on the tool body. If the clamping element is a screw, this usually extends through a hole in the cutting insert, which runs through both main surfaces of the cutting insert. Such a design is shown in FIG. 6.

The milling cutter 100 known from the prior art has, for example, a cylindrical tool body 102 which rotates about an axis of rotation A during the operation of the milling cutter 100. The tool body 102 has a recess 104, into which a cutting insert 106 is inserted. The cutting insert 106 rests directly on the tool body 102, which is oriented perpendicular to the direction of rotation, via a first main surface, wherein a screw 108 is inserted via a second main surface 110, which is opposite the first main surface, in order to clamp the cutting insert 106. The screw 108 is guided through a hole 112 in the cutting insert 106, which represents the clamping section of the cutting insert 106. Typically, the hole 112 is provided centrally in the second main surface 110 in order to clamp the cutting insert 106 as uniformly as possible and to be able to rotate or turn it when it is a turning cutting insert.

The screw 108 extends substantially perpendicularly to the axis of rotation A of the milling cutter 100 and to an active cutting edge 114 of the cutting insert 106, via which a workpiece is machined with the milling cutter 100.

In addition, other embodiments are known in which the screw or the clamping element does not extend exactly perpendicularly through the cutting insert but at an angle so that the clamping element exerts a force on the cutting insert during clamping which has at least two force components in different directions. However, here, too, the clamping element extends essentially perpendicularly to the axis of rotation of the milling cutter and to the active cutting edge of the cutting insert.

Due to this arrangement of the clamping element, it is possible for the clamping element to loosen during the operation of the milling cutter, as a result of which the cutting insert is no longer sufficiently fixed in the milling cutter.

SUMMARY OF THE INVENTION

It is therefore an object of the invention to provide an alternative possibility for permanently and securely fixing a cutting insert to the tool body.

The aforementioned object of providing alternative cutting insert attachment is achieved according to the invention by a cutting insert for a milling cutter with a first main surface for abutment against a stop surface of the milling cutter which is oriented essentially perpendicular to the direction of rotation, a second main surface opposite the first main surface which comprises the clamping surface and a lateral surface connecting the first main surface to the second main surface and which comprises a free surface. The lateral surface has at least one clamping section, over which the cutting insert is clamped in a recess in a tool body by means of a clamping element, in particular wherein the cutting insert is a turning cutting insert.

These and other embodiments will be described further in the detailed description which follows.

DETAILED DESCRIPTION

Figure 1:
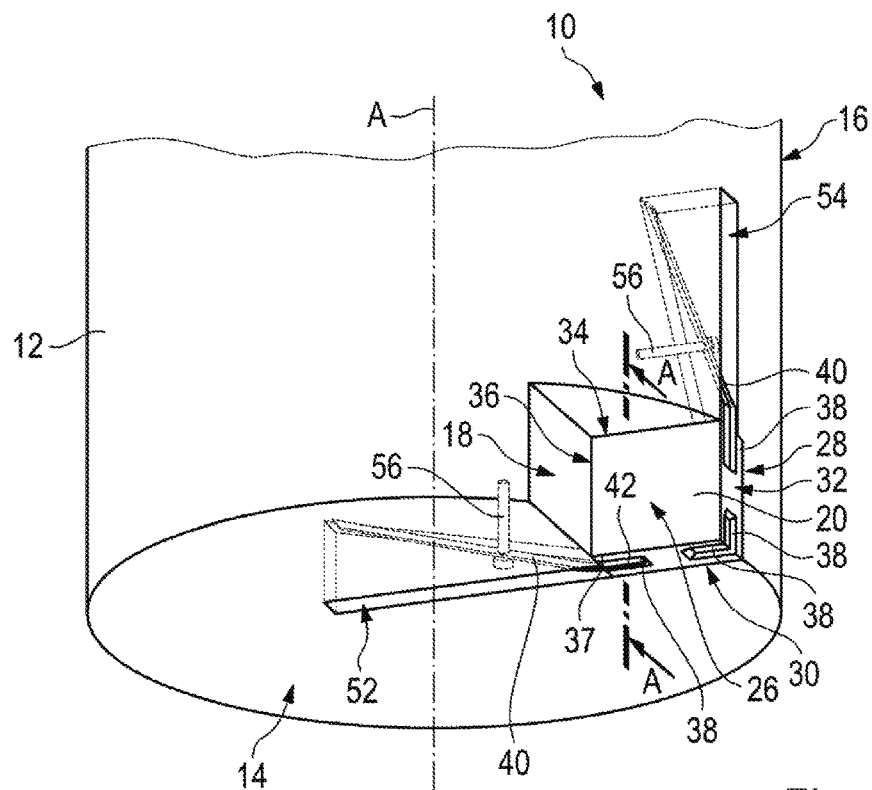
FIG. 1 shows a perspective view of a milling cutter according to the invention with a clamped cutting insert according to the invention.

Embodiments described herein can be understood more readily by reference to the following detailed description and examples and their previous and following descriptions. Elements and apparatus described herein, however, are not limited to the specific embodiments presented in the detailed description. It should be recognized that these embodiments are merely illustrative of the principles of the present invention. Numerous modifications and adaptations will be readily apparent to those of skill in the art without departing from the spirit and scope of the invention.

One aspect of the invention is to clamp a cutting insert over its lateral surface, as a result of which a completely new clamping of the cutting insert is realized. The forces transmitted by the cutting insert via its clamping section to the clamping element during the operation of the milling cutter thus have a different direction with respect to the clamping element. This arrangement minimizes the risk that the clamping element, and thus also the cutting insert, will loosen during the operation of the milling cutter. In addition, the risk that the clamping element deforms during operation or that deviations which cannot be avoided have an influence on the milling behavior during clamping or in the quality of the clamping element is reduced.

One aspect provides that the lateral surface is formed by a plurality of mutually converging side surfaces, in particular four side surfaces arranged at right angles with respect to one another. The lateral surface is accordingly substantially continuous, since the side surfaces merge into one another. The surface of the cutting insert is essentially formed by the two main surfaces and the lateral surface, which consists of the side surfaces. At the junctions of the side surfaces, edges can be present, provided that the cutting insert is, for example, cuboid in shape. In the case of a disc-shaped cutting insert, the lateral surface would be correspondingly cylindrical. Usually, at least the first main surface has the largest surface area of the different outer surfaces of the cutting insert since the cutting insert rests against the tool body via the first main surface and is supported on the latter via the first main surface.

In particular, the at least one clamping section is provided in an eccentric area of the lateral surface, that is to say not centrally on one of the side surfaces. Since the clamping portion is no longer arranged in the region of the main surface, but in the lateral surface, this can be arranged eccentrically, which results in a different distribution of forces during operation, in particular a different force distribution acting on the clamping element.

According to one embodiment, the at least one clamping section is formed as a groove-like recess in the surface of the lateral surface. The clamping section is thus not a continuous hole through which the clamping element extends. The groove-like recess ensures a form-fit between the clamping section and the clamping element in at least two directions. Furthermore, the clamping element can be accommodated in the recess in such a way that it does not protrude over the surface of the lateral surface, as a result of which the clamping element is protected toward the outside. Thus, the surface of the cutting insert forms the outermost region.

In particular, each side surface has two clamping sections at opposite ends, preferably the surface of the side surfaces being H-shaped in plan view and the recess lying between the legs of the "H". This ensures that the cutting insert can be used as a turning cutting insert since the side surfaces are each symmetrically formed so that the cutting insert can be rotated by 180° about the center of the corresponding side surface. The H-shaped embodiment is a preferred embodiment in which the cutting insert is, for example, cuboid in shape.

If the cutting insert itself is also symmetrically formed, this can additionally be rotated or applied around its own axis, whereby more cutting edges are available.

According to a further aspect, clamping sections of adjacent side surfaces merge into each other. This simplifies the manufacture of the cutting insert, since the two clamping sections which merge one into the other can be formed in one preparation step.

In addition, the clamping section can have a singular, obliquely inclined contact surface for the clamping element, wherein the contact surface is obliquely inclined in the direction of the second main surface, in particular the contact surface forming the bottom surface of the recess. Due to the singular, obliquely inclined contact surface, the clamping element can exert a clamping force on the cutting insert, which comprises two force components, i.e., is effective in two different directions. The cutting insert can thus be pressed into a corner of a recess of the tool body, whereby its positioning and fixing is easier.

The task is also achieved by a milling cutter having a tool body which is rotatable about an axis of rotation to which at least one cutting insert of the aforementioned type is releasably fastened in a recess of the tool body, wherein the cutting insert is force-actuated by at least one, in particular separate, arm-shaped, clamping element in the tool body, which engages on the clamping section. The clamping element is formed separately from the cutting insert. It can also be formed separately from the tool body or as part of the tool body. The clamping element engages on a side surface of the cutting insert, whereby the cutting insert is clamped in the recess of the tool body via one of its side surfaces.

One aspect provides that the recess in the tool body has a stop surface which points in the circumferential direction over which the cutting insert rests with its first main surface, in particular wherein the stop surface runs essentially perpendicular to the direction of rotation. During the operation of the milling cutter, the cutting insert rests against the stop surface of the tool body in order to transmit the forces arising during operation to the tool body. Accordingly, the first main surface and the stop surface of the tool body associated therewith are designed as large as possible in order to be able to absorb the forces evenly.

One aspect provides that the at least one clamping element is fastened, in particular pretensioned, to the tool body by means of a screw. The screw can be used to adjust the force with which the clamping element clamps the cutting insert. Accordingly, the cutting insert can be clamped over a defined and variable force.

Alternatively or additionally, a spring is provided, by means of which the pretension of the clamping element can likewise be adjusted.

According to one embodiment, a receiving pocket for the clamping element is formed in the tool body with a ramp-shaped contour for the at least one clamping element along which the clamping element extends, in particular wherein the bottom surface of the receiving pocket is additionally inclined obliquely in the longitudinal direction of the floor surface relative to a radial plane or axial plane of the tool body. Thus, the receiving pocket is provided recessed from the outer surface of the tool body, whereby it is ensured that the clamping element does not come into contact with the workpiece to be machined during operation. Therefore, the clamping element cannot be damaged during operation. Due to the ramp-shaped contour, the clamping element can at least partially support itself on the tool body. The ramp-shaped contour as well as its orientation to the radial or axial plane ensures that the clamping element exerts a force on the cutting insert, so that the latter is pressed axially in the direction of the tool body or radially inwards in the direction of the tool body.

In particular, the clamping element has an elongated shape and has a wedge-shaped cross section at the end, with which the clamping element interacts with the clamping section, so that the clamping element has a singular, oblique clamping surface with which it bears against the contact surface. The wedge-shaped cross-section at the end of the clamping element ensures that the clamping element applies a force during clamping of the cutting insert with a force which has two force components. The clamping surface is oriented in this case in such a way that the two force components act on the cutting insert in such a way that this is pressed into the recess.

The clamping surface can be complementary to the contact surface of the clamping section, in particular planar. This ensures that the clamping element acts on the cutting insert over a surface as large as possible, which results in a uniform force effect on the cutting insert.

One aspect provides that the clamping element presses the cutting insert axially against a first seating surface of the tool body or radially inwards against a second seating surface of the tool body. Depending on the orientation and arrangement of the clamping element, the cutting insert can thus additionally be pressed by the one clamping element to the stop surface against a first or second seating surface. In this way, the cutting insert is clamped firmly in the recess. The two seating surfaces as well as the stop surface delimit the recess in the tool body. The cutting insert is thus pressed by the clamping element into a corner of the recess, whereby the cutting insert is supported simultaneously on two surfaces, namely the stop surface and the first or second seating surface.

The clamping surface thus lies opposite a corner of the recess, which is formed by the two corresponding surfaces of the tool body.

According to one embodiment, a holding means is provided in the first and/or the second seating surface by means of which the cutting insert is held at least partially, in particular a holding means having a snap-in connection. The cutting insert can thus be fixed in the recess of the tool body in addition to the one clamping element by a holding means, in order to ensure a secure arrangement of the cutting insert, in particular during operation of the milling cutter. The one clamping element can thus press the cutting insert against the stop surface and the first or second seating surface, whereby a holding means on the second or first seating surface ensures the fixing of the cutting insert on the other seating surface, against which the cutting insert is not pressed by the clamping element.

A further embodiment provides two, in particular separate, arm-shaped, clamping elements which clamp the cutting insert, in particular wherein the two clamping elements are arranged essentially offset by 90° with respect to one another on the tool body, and in particular engage on adjacent side surfaces. This ensures a more uniform actuation of the cutting insert during clamping, so that it is clamped in the recess in the most homogeneous manner possible, in particular in two different corners of the recess, so that a form closure takes place in three directions. The cutting insert is thus pressed against all the limiting surfaces of the recess by the clamping elements.

In general, the holding means can also be provided in addition to the clamping element in order to enable a redundant fixing of the cutting insert or an additional securing. Accordingly, the holding means can be provided on the seating surface, against which the clamping element acts upon the cutting insert.

Further advantages and properties of the invention will be apparent from the following description and the drawings being referenced.

FIGS. 1 to 5 show a milling cutter 10 which comprises a tool body 12 which rotates about its axis of rotation A during the operation of the milling cutter 10.

Figure 2:
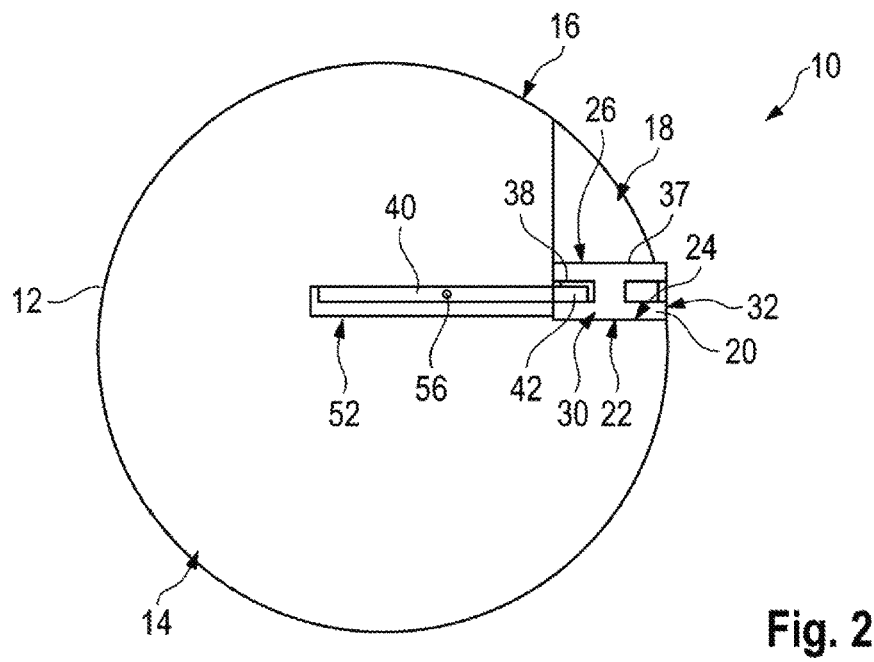
FIG. 2 shows a view from below of the milling cutter with the clamped cutting insert according to FIG. 1.
Figure 3:
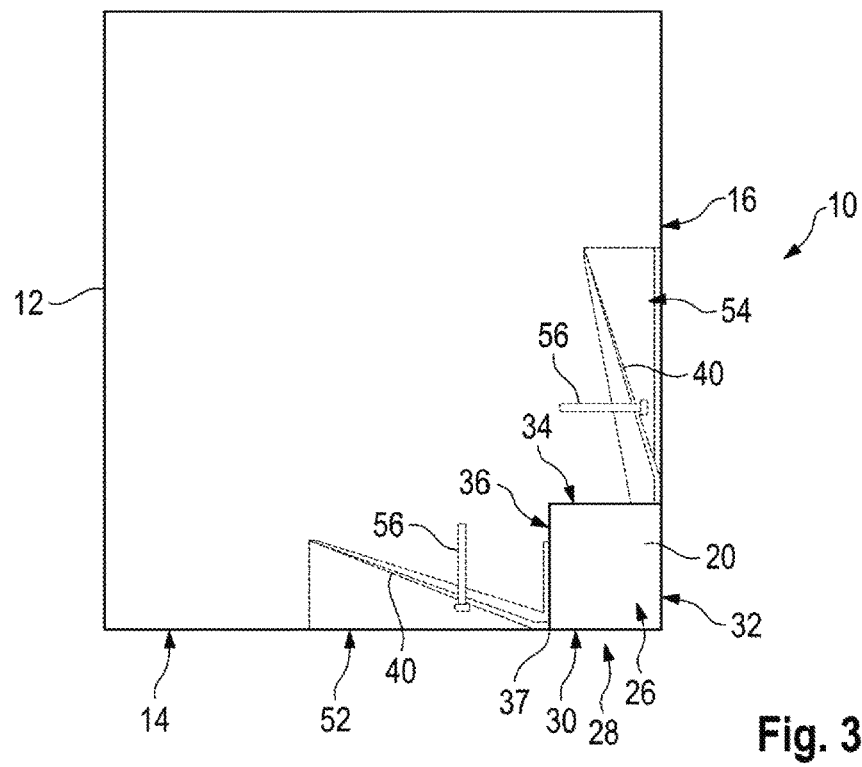
FIG. 3 shows a first side view of the milling cutter with the clamped cutting insert according to FIGS. 1 and 2.

The tool body 12 is essentially cylindrical and has, at one end, an end face 14, which is viewed in FIG. 2. The tool body 12 also has a cylindrical circumferential surface 16 which extends from the end face 14 to the other end of the tool body 12, which is not shown here.

In the tool body 12, a recess 18 is provided, which interrupts both the end face 14 and the circumferential surface 16. The recess 18 thus extends radially inwards beginning from the circumferential surface 16 and in an axial direction beginning from the end face 14.

A cutting insert 20, which is described in more detail below, is releasably fastened in the recess 18, in particular with reference to FIGS. 1 and 5.

The cutting insert 20 has a first main surface 22 (see FIG. 5), via which the cutting insert 20 rests against a stop surface 24 of the tool body 12 which delimits the recess 18 in the tool body 12. The stop surface 24 extends essentially perpendicular to the direction of rotation of the milling cutter 10 and perpendicular to the end face 14 of the tool body 12.

The cutting insert 20 also has a second main surface 26, which is provided opposite the first main surface 22. As is particularly apparent from FIGS. 1, 2 and 4, the second main surface 26 is oriented towards the free space of the recess 18.

The second main surface 26 correspondingly has the clamping surface via which material removed from a workpiece is guided away.

Furthermore, the cutting insert 20 has a lateral surface 28, which connects the first main surface 24 to the second main surface 26.

In the embodiment shown, the cutting insert 20 is of cuboidal design, so that the lateral surface 28 is formed by four side surfaces 30 to 36, which each merge with one another via edges.

The main surfaces 22, 26 also merge via the edges into the side surfaces 30 to 36, wherein these edges are cutting edges 37, which are used for machining a workpiece. Depending on the arrangement and orientation of the cutting insert 20 in the recess 18, at least one of the cutting edges 37 is active.

In the illustrated embodiment, for example, the cutting edge 37 is active, which lies between the second main surface 26 and the first side surface 30. For reasons of clarity, therefore, only this cutting edge 37 is provided with a reference symbol in the figures.

Alternatively or additionally, the cutting edge which is between the second main surface 26 and the second side surface 32 can also be active. This depends on the use of the milling cutter 10.

In general, because of its symmetrical design the cutting insert 20 is a turning cutting insert, which is why it can be rotated by 180° about its central axis so that the second main surface 26 rests against the stop surface 24 and the first main surface 22 comprises the cutting surface. Correspondingly, a different cutting edge would serve for machining the workpiece.

Furthermore, the lateral surface 28 has the free surface which, in the embodiment shown, points radially outwards and is provided in the orientation shown on the second side surface 32 (see FIG. 1). If the cutting insert 20 is used and/or rotated, the free surface is located on a different side surface 30, 34, 36, but always on the lateral surface 28.

The lateral surface 28 also has at least one clamping section 38, via which the cutting insert 20 is clamped in the recess 18.

In the embodiment shown, the cutting insert 20 has a total of eight clamping sections 38 which are provided on opposite ends of the side surfaces 30 to 36, respectively.

The clamping sections 38 are also designed such that two clamping sections 38 of adjacent side surfaces 30 to 36 merge into one another. This is evident from FIG. 1 in which it is shown how the clamping section 38 on the right end of the first side surface 30 merges into the clamping section 38 of the second side surface 32. The clamping section 38 at the right end of the first side surface 30 thus extends outwardly from the second side surface 32 in the direction towards the fourth side surface 36. The length of this clamping section 38 corresponds to approximately one third of the total length of the first side surface 30.

Analogously, the clamping section 38 can be formed at the left end of the second side surface 32, which extends accordingly from the first side surface 30 to over approximately one third of the total length of the second side surface 32 in the direction of the third side surface 34.

Figure 4:
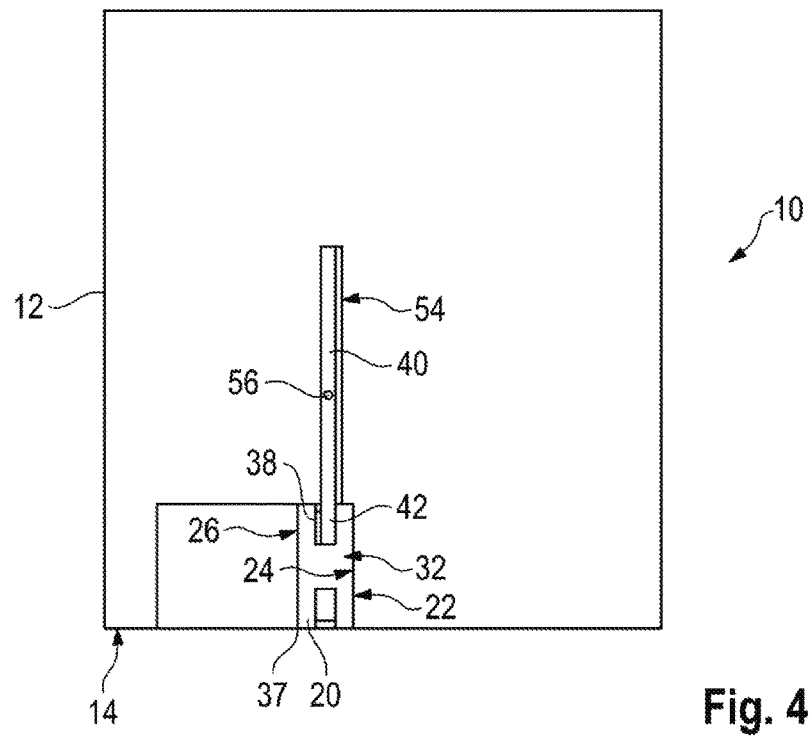
FIG. 4 shows a second side view of the milling cutter with clamped cutting insert according to FIGS. 1 to 3.

In top view, therefore, an H-shaped configuration of the side surfaces 30 to 36 results, as can be clearly seen in FIGS. 2 and 4.

The clamping sections 38 are formed as groove-like recesses in the surface of the respective side surfaces 30 to 36 so that the recesses of the clamping sections 38 lie between the respective legs of the "H".

Figure 5:
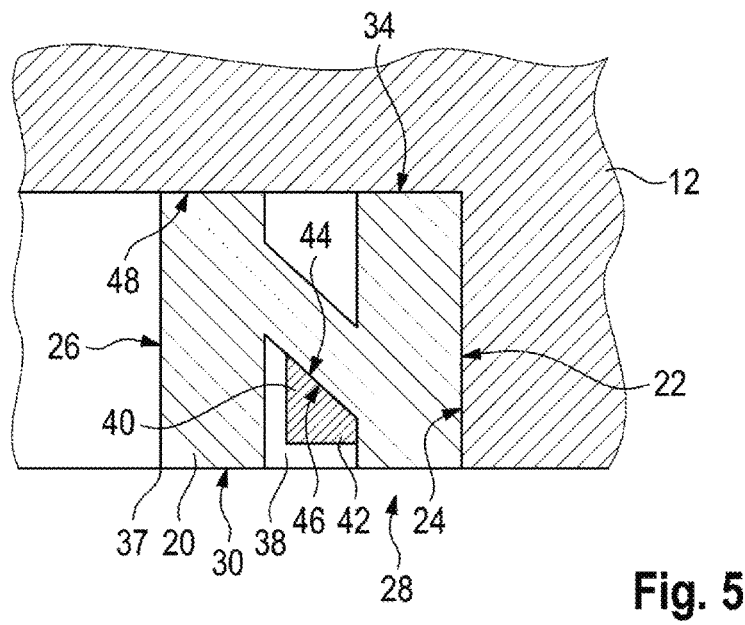
FIG. 5 shows a schematic partial sectional representation of the milling cutter with the cutting insert clamped along the line A-A according to FIG. 1.
Figure 6:
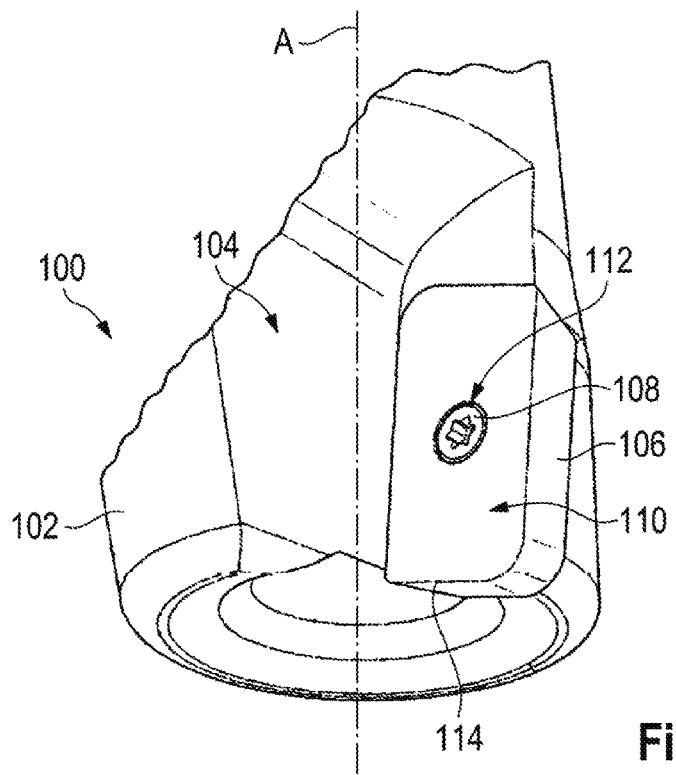
FIG. 6 shows a milling cutter with a clamped cutting insert according to the prior art.

A clamping element 40 can be taken up form-fittingly into the recesses, wherein the recesses of the clamping sections 38 and the clamping element 40 are designed in such a way that the outward-facing surface of the clamping element 40 is deeper than the surface of the corresponding side surface 30 to 36 (see in particular FIG. 5). The clamping element 40 is thereby sheltered in the corresponding clamping section 38.

In the embodiment shown, two clamping elements 40 are provided which engage the cutting insert 20 on two side surfaces 30 to 36 which are essentially perpendicular to one another. The two side surfaces 30 to 36, which interact with the clamping elements 40, are adjacent side surfaces 30, 32 of the cutting insert 20. In the embodiment shown, the first clamping element 40 is associated with the left clamping section 38 of the first side face 30, and the second clamping section 40 is associated with the right clamping section 38 of the second side surface 32. The clamping elements 40 thus do not engage the clamping sections 38 of the adjacent side surfaces 30, 32, which merge into one another.

The clamping elements 40 are formed separately from the tool body 12 and the cutting insert 20. In an alternative embodiment, however, the clamping elements 40 can also be formed as part of the tool body 12.

In the embodiment shown, the clamping elements 40 are also of arm-shaped design so that they have a substantially elongated shape. The ends 42 of the clamping elements 40, which in each case interact with the clamping sections 38 of the cutting insert 20, have a wedge-shaped cross-section. As a result, the clamping elements 40 each have a singular, oblique clamping surface 44, over which the clamping element 40 abuts against a contact surface 46 formed in the clamping section 38 (see FIG. 5). The bearing surface 46 is the bottom surface of the groove-like recess of the clamping section 38. The clamping surface 44 is inclined obliquely in the direction of the first main surface 22.

The contact surface 46 is singular and inclined obliquely in the direction of the second main surface 26, as is evident from FIG. 5. Accordingly, the contact surface 46 and the clamping surface 44 are formed complementary to one another, being planar. This ensures that the force applied by the clamping element 40 to the cutting insert 20 is distributed as homogeneously as possible.

On account of the oblique profiles of the contact surface 46 as well as of the clamping surface 44, it is also ensured that the clamping element 40 clamps the cutting insert 20 in such a way that the clamping force exerted by the clamping element 40 has two force components, i.e., acts in two different directions on the cutting insert 20, so that the latter is pressed in two directions.

The first clamping element 40 shown in FIG. 5 presses the cutting insert 20 correspondingly against the stop surface 24 in the recess 18 as well as against a first seating surface 48 in the tool body 12, on which the cutting insert 20 is supported via the third side surface 34 (see in particular FIG. 5). The first clamping element 40 accordingly presses the cutting insert 20 axially inwardly against the first seating surface 48.

As is particularly apparent from FIG. 5, the clamping surface 44 is formed such that it faces a corner of the recess 18. The corner of the recess 18 is formed by the stop surface 24 and the first seating surface 48.

The second clamping element 40 shown in FIG. 1 is designed in an analogous manner to the first clamping element 40, which has been shown in more detail in FIG. 5 and has just been described.

The second clamping element 40 accordingly also has an end 42 with a wedge-shaped cross-section, so that it also has a singular, oblique clamping surface 44. The clamping surface 44 interacts with a correspondingly complementary, singular, obliquely inclined contact surface 46 of the associated clamping section 38 in the second side area 32. The second clamping element 40 thus also presses the cutting insert 20 in two different directions, so that the cutting insert 20 is pressed again against the stop surface 24 and a second seating surface 50 (see FIG. 1). The second clamping element 40 thus ensures that the cutting insert 20 is additionally pressed radially inwards, namely against the second seating surface 50.

The clamping surface 44 of the second clamping element 40 thus also faces a corner of the recess 18, which is formed by the stop surface 24 and the second seating surface 50.

In general, the recess 18 is delimited by three surfaces which are essentially perpendicular to one another, namely the stop surface 24, the first seating surface 48 and the second seating surface 50.

Due to the configuration of the obliquely inclined clamping surfaces 44, the two clamping elements 40 press the cutting insert 20 once against the direction of rotation of the milling cutter 10 in the direction of the stop surface 24, in the axial direction against the first seating surface 48 and radially inward against the second seating surface 50. Correspondingly, the cutting insert 20 is form-fittingly pressed into the corners of the recess 18 and is securely clamped.

Each of the two clamping elements 40 is received in an associated receiving pocket 52, 54, which is formed in the tool body 12. The receiving pockets 52, 54 each have a ramp-shaped contour, over which the corresponding clamping element 40 at least partially rests with its elongated base element.

The first receiving pocket 52 for the first clamping element 40 is machined in the end face 14 of the tool body 12, while the second receiving pocket 54 for the second clamping element 40 is provided in the circumferential surface 16 of the tool body 12. Accordingly, the first receiving pocket 52 extends in an axial direction beginning from the end face 14, while the second receiving pocket 54 extends radially beginning from the circumferential surface 16.

In addition, the two clamping elements 40 are each fastened to the tool body 12 by means of screws 56. A pretensioning of the clamping elements 40 can be adjusted via the screws 56. Alternatively or additionally, springs can be provided, which likewise serve to pretension the clamping elements 40.

Alternatively, the clamping elements 40 are formed in one piece with the tool body 12. For example, the clamping elements 40 are integrally connected to the tool body 12 via their ends opposite the ends 42 and are merely pretensioned more strongly by means of the screws 56 in order to clamp the cutting insert 20.

In addition or alternatively at least one additional holding means can be provided in the recess 18, via which the cutting insert 20 is (additionally) secured. The holding means is provided either on the first seating surface 48 or the second seating surface 50. The corresponding clamping element 40 can then be omitted, which presses the cutting insert 20 against the first seating surface 48 or the second seating surface 50.

The holding means comprises, in particular, a snap-in connection so that the cutting insert 20 is pressed into the corresponding seating surface 48, 50 in a simple manner and thus snaps into the holding means. The final adjustment and fixing of the cutting insert 20 then takes place via the at least one clamping element 40.

An additional holding means can also be provided on both seating surfaces 48, 50, which in each case act in support of the clamping elements 40.

In general, therefore, an alternative possibility is provided for clamping the cutting insert 20 into the milling cutter 10, wherein a fixation of the cutting insert 20 via a central and centrally arranged clamping element which extends through the cutting insert 20 can be dispensed with.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A cutting insert for a milling cutter, the cutting insert comprising:
   a first main surface;
   a second main surface opposite the first main surface, the second main surface comprising a cutting surface; and
   a lateral surface which connects the first main surface to the second main surface, the lateral surface comprising a free surface and at least one clamping section,
   wherein the lateral surface is formed by at least two side surfaces; and
   wherein each of the side surfaces comprises two clamping sections at opposite ends thereof, forming a generally H-shaped surface on the side surfaces in plan view.

2. The cutting insert of claim 1, wherein the lateral surface is formed by four side surfaces arranged at right angles to one another that merge into one another.

3. The cutting insert of claim 1, wherein the at least one clamping section is a groove-like recess in the surface of the lateral surface.

4. The cutting insert of claim 3, wherein the clamping sections of adjacent side surfaces merge into one another.

5. The cutting insert of claim 1, wherein the clamping section comprises an obliquely inclined contact surface; and
   wherein the obliquely inclined contact surface is inclined in the direction of the second main surface.

6. A milling cutter comprising:
   a tool body which is rotatable about an axis of rotation, the tool body defining at least one recess for receiving a cutting insert;
   at least one cutting insert disposed in the at least one recess, the cutting insert comprising:
      a first main surface;
      a second main surface opposite the first main surface, the second main surface comprising a cutting surface; and
      a lateral surface which connects the first main surface to the second main surface, the lateral surface comprising a free surface and at least one clamping section; and
   at least one clamping element fastened to the tool body which engages the at least one clamping section of the at least one cutting insert,
   wherein the at least one clamping element is arm-shaped;
   wherein the at least one clamping element clamps the at least one cutting insert by force-actuation;
   wherein the lateral surface is formed by at least two side surfaces; and
   wherein each of the side surfaces comprises two clamping sections at opposite ends thereof, forming a generally H-shaped surface on the side surfaces in plan view.

7. The milling cutter of claim 6, wherein the at least one recess in the tool body comprises a stop surface which runs generally perpendicular to a direction of rotation of the tool body; and
   wherein the first main surface of the at least one cutting insert abuts the stop surface.

8. The milling cutter of claim 6, wherein the at least one clamping element is pretensioned and fastened to the tool body by a screw.

9. The milling cutter of claim 6, wherein the tool body defines at least one receiving pocket for the at least one clamping element;
   wherein the at least one receiving pocket has a ramp-shaped contour for the at least one clamping element along which the at least one clamping element extends.

10. The milling cutter of claim 9, wherein a bottom surface of the at least one receiving pocket is inclined obliquely in the longitudinal direction relative to a radial plane or an axial plane of the tool body.

11. The milling cutter of claim 10, wherein the at least one clamping surface of the at least one clamping element is generally planar; and
    wherein the at least one clamping surface of the at least one clamping element has a complementary shape to a shape of the contact surface of the cutting insert.

12. The milling cutter of claim 6, wherein the at least one clamping element has an elongated shape and a wedge-shaped cross-section at the end; and
    wherein the wedge-shaped cross section at the end interacts with the at least one clamping section of the at least one cutting insert so that the at least one clamping element has a singular, oblique clamping surface which bears against the at least one contact surface.

13. The milling cutter of claim 6, wherein the at least one clamping element presses the at least one cutting insert axially against a first seating surface of the tool body or radially against a second seating surface of the tool body.

14. The milling cutter of claim 13, wherein the first seating surface or the second seating surface of the tool body comprises a snap-in connection for retaining the at least one cutting insert.

15. A milling cutter comprising:
    a tool body which is rotatable about an axis of rotation, the tool body defining at least one recess for receiving a cutting insert;
    at least one cutting insert disposed in the at least one recess, the cutting insert comprising:
       a first main surface;
       a second main surface opposite the first main surface, the second main surface comprising a cutting surface; and
       a lateral surface which connects the first main surface to the second main surface, the lateral surface comprising a free surface and at least one clamping section; and
    at least one clamping element fastened to the tool body which engages the at least one clamping section of the at least one cutting insert,
    wherein the at least one clamping element is arm-shaped;
    wherein the at least one clamping element clamps the at least one cutting insert by force-actuation;
    wherein the milling cutter comprises two arm-shaped clamping elements which clamp the at least one cutting insert; and wherein the two arm-shaped clamping elements are offset by 90° with respect to one another on the tool body and engage adjacent side faces of the at least one cutting insert.

* * * * *